US 6,713,545 B2

(12) United States Patent
Petiniot et al.

(10) Patent No.: US 6,713,545 B2
(45) Date of Patent: Mar. 30, 2004

(54) UNIVERSAL MASTERBATCH

(75) Inventors: Nicole Petiniot, Liège (BE); Philippe Rasquin, Fléron (BE)

(73) Assignee: Cabot Corporation, Boston, MA (US)

( * ) Notice: Subject to any disclaimer, the term of this patent is extended or adjusted under 35 U.S.C. 154(b) by 150 days.

(21) Appl. No.: 09/748,101

(22) Filed: Dec. 22, 2000

(65) Prior Publication Data

US 2001/0049424 A1 Dec. 6, 2001

Related U.S. Application Data

(63) Continuation of application No. 08/297,674, filed on Aug. 29, 1994, now abandoned.

(51) Int. Cl.$^7$ .................................. C08L 5/20
(52) U.S. Cl. ................. 524/224; 524/223; 524/230; 524/236; 524/474; 525/95; 525/88; 525/222; 525/232
(58) Field of Search .................. 524/401, 81, 223, 524/230, 227; 525/236, 224

(56) References Cited

U.S. PATENT DOCUMENTS

| 4,206,100 A | | 6/1980 | Kyo et al. ................. 260/22 R |
| 4,412,941 A | | 11/1983 | Probst et al. ............... 252/511 |
| 4,764,326 A | * | 8/1988 | Hakim ....................... 264/211 |
| 4,764,556 A | | 8/1988 | Lausberg et al. ............ 525/67 |
| 4,772,664 A | | 9/1988 | Ueda et al. .................. 525/92 |
| 4,791,158 A | | 12/1988 | Lausberg et al. ........... 524/156 |
| 4,798,885 A | | 1/1989 | Mason et al. ............... 523/435 |
| 4,810,733 A | * | 3/1989 | Sakuma et al. ............. 523/206 |
| 4,868,245 A | * | 9/1989 | Pottick et al. ................ 525/98 |
| 4,906,687 A | | 3/1990 | Modic ......................... 525/57 |
| 4,943,399 A | | 7/1990 | Taubitz et al. .............. 264/101 |
| 5,006,603 A | | 4/1991 | Takaki et al. ............... 525/105 |
| 5,049,610 A | | 9/1991 | Takaki et al. ............... 524/514 |
| 5,124,391 A | | 6/1992 | Muehlbach et al. ........ 524/420 |
| 5,145,904 A | | 9/1992 | Muehlbach et al. ........ 524/494 |
| 5,176,751 A | * | 1/1993 | Findley ...................... 106/502 |
| 5,219,903 A | * | 6/1993 | Fujii et al. .................. 523/351 |
| 5,221,781 A | * | 6/1993 | Aida et al. .................. 524/433 |
| 5,459,210 A | * | 10/1995 | Kihara et al. ................. 526/73 |
| 5,670,561 A | * | 9/1997 | Scheibelhoffer et al. .... 523/351 |
| 5,681,894 A | * | 10/1997 | Williams et al. ............. 525/89 |
| 5,843,524 A | * | 12/1998 | Wimolkiatisak et al. .... 427/212 |
| 2001/0049424 A1 | * | 12/2001 | Petiniot et al. ............... 526/89 |

FOREIGN PATENT DOCUMENTS

| EP | 0 583 228 A2 | * | 2/1994 | ........... C08L/53/02 |
| EP | 0 705 875 A1 | * | 4/1996 | ........... C08K/9/08 |
| JP | A-56 145 926 | | 11/1981 | |
| JP | A-01 011 133 | | 1/1989 | |
| JP | A-01 108 268 | | 4/1989 | |
| JP | A-02 281 046 | | 11/1990 | |

* cited by examiner

*Primary Examiner*—David W. Wu
*Assistant Examiner*—Rip A. Lee

(57) ABSTRACT

A universal masterbatch composition for adding fillers and particularly pigment to polymers, having up to 85%, by weight, of at least one filler, up to 25%, by weight, of at least one viscosity modifier and a remainder quantity of a styrene butadiene block copolymer. The composition further includes up to 5%, by weight, of at least one processing aid and up to 2%, by weight of at least one antioxidant.

9 Claims, No Drawings

UNIVERSAL MASTERBATCH

RELATED APPLICATIONS

This application is a continuation of application Ser. No. 08/297,674, filed Aug. 29, 1994, now abandoned.

FIELD OF THE INVENTION

The present invention relates to pigment containing masterbatch resin compositions which are compatible with a broad range of base polymers, produced by the mixture of the plastic composition masterbatch resin and base polymers.

BACKGROUND

The term "masterbatch" is generally used to connote a carrier resin containing one or more additives. The most common additive is a pigment which imparts color to the final polymer system. The masterbatch is generally added to, and mixed with, a base polymer to add a desired level of pigment. The amount of masterbatch mixed with a base polymer varies depending on the pigmentation desired in the base polymer. Typically, 0.5 to 30%, by weight of masterbatch is added to the base polymer. The term "universal masterbatch" is utilized to refer to a masterbatch which is applicable for use with a variety of base polymers.

For purposes of the present invention, base polymers shall mean thermoplastic polymers, including polyethylene, polypropylene, polystyrene homo and copolymers, ABS (acrylonitrile polymer with butadiene styrene terpolymer), PA (polyamide), PC (polycarbonate), PUR (polyurethane), PBT (polybutylene terephthalate), PET and thermoplastic alloys containing at least one of the above polymers.

Generally known universal masterbatch compositions utilize ethylene vinyl acetate copolymer (EVA) as a carrier resin. These carrier resins have the compatibility due to the polar vinyl acetate monomer but also suffer from the thermal decomposition of the same monomer at temperatures above about 230° C. giving acidic volatiles. Therefore, masterbatch compositions utilizing EVA as a carrier resin are generally not suitable for use in thermoplastic polymers that will be exposed to temperatures greater than 230° C. during processing. Additionally chemical reactions could occur between the acidic residue and certain thermoplastics such as polyamide or polycarbonate resulting in a degradation of mechanical properties.

Fillers, including pigments, are added to masterbatch compositions to impart desired properties to the thermoplastic polymer that will incorporate the masterbatch. Typical fillers and pigments for masterbatch compositions include carbon black, titanium dioxide, calcium carbonate, talc, lithopone, silica, iron oxide and organic pigments. Other additives, such as ultraviolet stabilizers, antioxidants, slip stabilizers, lubricants, optical brighteners, antifog and antistatic agents may be incorporated into the masterbatch composite. In addition to imparting desirable properties to the masterbatch and the thermoplastic polymer that will incorporate the masterbatch, carbon black has been utilized as a black pigment. Similarly, titanium dioxide has been utilized as a white pigment in masterbatch compositions.

To some degree, thermoplastic polymers suffer a decrease in mechanical performance when pigments are added. While not wishing to be so limited, the inventors attribute the decrease in performance to non-uniform dispersions of the pigment. While some attempts have been made in altering the viscosity of the thermoplastic to achieve improved dispersion, a masterbatch which achieves uniform pigment dispersion at elevated loadings; which is compatible over a broad range of thermoplastic polymers; and which maintains or improves the mechanical properties of the thermoplastic would be a considerable improvement in the art.

An object of the present invention is to overcome the limitations associated with masterbatches using EVA as a carrier resin.

Another object is to maintain or improve on the mechanical impact properties of pigmented containing thermoplastic base polymer utilized.

SUMMARY OF THE INVENTION

Accordingly, we have discovered a masterbatch composition comprising up to 85% by weight of at least one filler, up to 25% by weight of at least one viscosity modifier; and a balance by weight of a styrene butadiene styrene block copolymer (SBS) as a carrier resin. Due to the stability characteristics at high temperatures such as 260° C., styrene butadiene styrene block linear or star copolymers as carrier resins show a superior advantage to EVA carrier resins in universal masterbatches.

Styrene butadiene styrene (SBS), has been utilized in masterbatch compositions as an impact modifier to improve the mechanical performance of the carrier resin. Generally, when SBS is utilized in a masterbatch in combination with high levels of fillers, the viscosity of the masterbatch becomes unacceptably high. The masterbatch composition of the present invention overcomes this problem.

In an alternate embodiment, the masterbatch composition of the present invention may additionally include up to 5%, by weight, of at least one processing aid, which is preferably a metal or organic stearate, stearic acid or fluroelastomer. In yet a further embodiment, the masterbatch composition of the present invention may further include up to 2%, by weight of at least one antioxidant.

The masterbatch composition of the present invention may be prepared by methods known to those of ordinary skill in the art for preparing resin compositions. Typically, the components of the masterbatch are admixed with the SBS carrier resin, at above the softening point of the SBS, in a conventional batch or continuous mixing apparatus, such as an extruder, kneader or Banbury mixer.

The final plastic composition of the present invention comprises 0.5 to 30%, by weight, and preferably 1 to 15%, by weight of the masterbatch of the present invention, with the remainder being a thermoplastic resin. The masterbatch composition comprises: up to 85%, by weight, of at least one filler; up to 25%, by weight, of at least one viscosity modifier selected from a group consisting of ethylene bis stearamide, polybutylene and hot melt acrylic copolymers with a melt index of greater than 50; and a remainder quantity of preferably of a styrene butadiene styrene block linear or star copolymer totalling up to 100% by weight of the masterbatch.

As set forth above, the masterbatch composition used in the plastic composition may additionally include up to 5%, by weight, of at least one processing aid, which is preferably a metal or organic stearate or a fluroelastomer. The masterbatch composition used in the plastic composition may further include up to 2%, by weight of at least one antioxidant.

The thermoplastic composition of the present invention may be prepared by conventional thermoplastic processing methods, for injection molding, for example by incorporating the masterbatch into the plastic at a temperature above the softening temperature of the plastic in a conventional processing apparatus, such as an extruder, kneader or mixer, or injection molding equipment.

An advantage of the masterbatch of the present invention is that the masterbatch is compatible with a wide variety of thermoplastics and can be easily incorporated into these plastics.

Another advantage of the masterbatch of the present invention is that the masterbatch will generally maintain, and often improve, the impact resistance and tensile strength of thermoplastics incorporating the masterbatch.

A further advantage of the masterbatch of the present invention is that the masterbatch is stable at higher temperatures, than those generally utilized with masterbatches having an EVA as a carrier polymer.

A still further advantage of the present invention is that the masterbatch has lower hygroscopicity due to lower polarity.

Further details and advantages of the present invention, will become apparent from the following description and examples.

DETAILED DESCRIPTION OF THE INVENTION

According to the present invention, a masterbatch composition is disclosed having a carrier resin which is a styrene butadiene styrene (SBS) block or star copolymer. Preferably, the SBS comprises at least 20% styrene with the remainder polybutadiene to facilitate ease of processing and mixing. SBS copolymers containing elevated styrene levels which are suitable for use in the present invention, are commercially available from a variety of sources. Examples of suitable SBS copolymers include: BASF Styrolux 684 D, which is a star shaped SBS copolymer having a polybutadiene content of approximately 26%; (commercially available from BASF Corporation in Parsippany, N.J.); Phillips KK 38, which is a star shaped SBS copolymer having a polybutadiene content of approximately 30%, (and is commercially available from Phillips 66, of Houston, Tex.); Finaclear 520, which is a linear block SBS copolymer having a polybutadiene content of approximately 27%, (and is commercially available from Fina Oil & Chemical, Dallas, Tex.).

As will be understood by those of ordinary skill in the art, the pigment component of the universal masterbatch composition of the present invention is utilized to provide color. Suitable pigments for imparting color to resins, and thermoplastics, are generally known in the art and indicate carbon black as a black pigment and titanium dioxide as a white pigment. Other white pigment, suitable for use in the present invention, include, but are not limited to, zinc oxide, zinc sulfide, lead white, lithopone and antimony white. Additional black pigments, suitable for use in the present invention, include, but are not limited to, iron oxide black, manganese black, cobalt black and antimony black. Inorganic colored pigments; such as chrome oxide green, ultramarine blue, or organic colored pigments, such as azo pigments and phthalocyanines, may be used in the masterbatch of the present invention to achieve certain hues. As will be recognized by those of ordinary skill in the art, it may be advantageous to use one or more pigments. The present invention contemplates that a quantity of pigment up to 85% by weight of the masterbatch may be used, the actual amount utilized will be dependent on the color characteristics of the plastic composition and the base thermoplastic selected.

In the masterbatch composition of the present invention, up to 25% by weight of at least one viscosity modifier may be utilized to reduce elevated viscosity levels attributable to the addition of pigments or other additives to the carrier resin. The viscosity modifier will also function to generally increase the solubility of the masterbatch into a desired base thermoplastic. Suitable viscosity modifiers for use in the masterbatch of the present invention include, but are not limited to, ethylene bis stearamide (EBS), polybutylene (PB) and hot melt acrylic copolymers such as EBA, and EEA (ethylene ethyl acrylate), EMA and terpolymers.

In an alternate embodiment a quantity of about 0 to 70% by weight of at least one filler is utilized in the universal masterbatch composition of the present invention to reinforce and/or impart desired characteristics to the masterbatch, and/or to the thermoplastic or that will incorporate the masterbatch. Other fillers for use in the masterbatch of the present invention include, but are not limited to, silica, talc, graphite, asbestos, glass fibers, wollastonite, dolomite, calcium silicate, calcium carbonate, glass spheres, powdered quartz, silicon nitride, boron nitride, carbon fibers, and the like, as well as mixtures of these fillers.

As will be recognized by those of ordinary skill in the art, occasionally during preparation of a masterbatch, it will be difficult to remove the masterbatch from the walls of the vessel utilized in preparing the masterbatch. Similarly, during processing of a thermoplastic, the plastic may stick to the processing equipment. This sticking is especially a problem if the thermoplastic is utilized in an injection molding process. To overcome these problems, and others, the masterbatch of the present invention may incorporate up to 5%, by weight, of at least one processing aid. Preferable processing aids include, but are not limited to, metallic stearates, such as zinc stearate, calcium stearate, magnesium stearate and the like, stearic acid, organic stearates, derived from the reaction of stearic acid with an alcohol or amine such as glycerol mono stearate (GMS) and fluoroelastomers.

The masterbatch of the present invention may additionally include at least one antioxidant in an amount of up to 2%, by weight. The presence of an antioxidant helps to prevent oxidation of components in the masterbatch which would lead to discoloration. Suitable antioxidants for use in the present invention include, but are not limited to, antioxidants known in the art for use in resins: such as organic phophites or organic phosponites. Sterically hindered phenols, or amines, hydroquinones, substituted members of these groups and mixtures of these can also be used.

Other additives selected from the group of ultra violet stabilizers, antifogging agents, antistatic agents, or process lubricants may be added. Preferably a quantity of from 0 to 15% by weight of the masterbatch is added.

Preferred masterbatch compositions of the present invention include the following black, white and blue masterbatch compositions. The black masterbatch composition comprises a quantity of from 20% to 60%, and preferably about 35%, by weight of carbon black pigment and 0 to 5%, and preferably about 0.6%, by weight, of zinc stearate or calcium stearate as a processing aid. Further included is a quantity of 0 to 25%, and preferably about 10%, by weight, of viscosity modifier. A quantity of 0 to 2%, and preferably about 0.5%, by weight, of an antioxidant was used. Preferably the antioxidant is a blend of phenolic and organic phosphite. The remainder of the masterbatch composition is preferably about 54.4%, by weight, of SBS. In a preferred embodiment the black pigment is carbon black; the processing aid is zinc stearate; and the viscosity modifier is EBS.

The white masterbatch composition comprises a quantity of from 20 to 85%, preferably about 60%, by weight white pigment and 0 to 5%, preferably about 0.6%, by weight, of a processing aid. A quantity 0 to 25%, preferably about 10%, by weight, of viscosity modifier and 0 to 2%, preferably about 0.5%, by weight, of at least one antioxidant is also contemplated.

The remainder of the composition is, preferably about 28.9%, by weight-of, SBS. In a preferred embodiment the white pigment is titanium dioxide, the processing aid is zinc stearate, and the viscosity modifier is PB or EBS.

The blue masterbatch composition comprises a quantity of from about 0 to 20%, and preferably about 2.5%, by weight of white pigment such as titanium dioxide and 0 to 30%, preferably about 26%, by weight, of a blue pigment such as ultramarine blue. In addition a quantity of 0 to 50%, preferably about 35%, by weight, of a filler, and 0 to 5%, preferably about 3%, by weight, of a processing aid; and 0 to 25%, preferably about 6%, by weight, of a viscosity modifier is added. A remainder quantity of SBS of preferably about 27.5%, by weight is utilized.

In a preferred embodiment, the processing aid is calcium stearate; the filler is calcium carbonate; and the viscosity modifier is EMA (ethylene methyl acrylate copolymer).

The masterbatch composition of the present invention may be prepared in manners known to those of ordinary skill in the art for preparing resin compositions. Typically, the components of the masterbatch are admixed with the SBS carrier resin, at above the softening point of the SBS, in a conventional mixing apparatus, such as an extruder, kneader or mixer.

One method for producing the masterbatch of the present invention is to use a Banbury mixer.

The masterbatch compositions of the present invention may be produced by other methods for producing polymer compositions known to those of ordinary skill in the art.

The masterbatches of the present invention are effective in a wide variety of thermoplastics including, but not limited to: polyamides (PA), polycarbonates (PC), polyacetals (POM), acrylonitrile butadiene styrene terpolymers (ABS), styrene acrylonitrile copolymers (SAN), thermoplastic polyurethanes (TPU), general purpose polystyrenes (GPPS), polyphenylene oxides (PPO or PPE), styrene maleic anhydride copolymers (SMA), styrene methylmethacrylate copolymers (SMMA), methacrylated acrylonitrile butadiene styrene polymers (MABS), acrylate styrene acrylonitrile polymers (ASA), high impact polystyrenes (HIPS), styrene butadiene copolymers (SB), polyethylene terephthalates (PET), polybutylene terephthalates (PBT), cyclohexanedimethanol ethylene glycol terephthalic acid copolymers (PETG) and other polyesters, ethylene alkyl acrylate copolymers such as (EMA, EEA, EBA), polyethylenes (PE), polypropylenes (PP), ethylene methacrylic acid copolymers (EMAA), polymethylmethacrylates (PMMA) and other acrylic polymers, engineer plastics blends PC/ABS, PC/PBT, PC/TPU, PA/ABS, PPO/PS, PPE/HIPS and the like.

The present invention further contemplates a plastic composition comprising a thermoplastic resin having from 0.5 to 30% by weight of a masterbatch composition. The Masterbatch composition further comprises up to 85% by weight of at least one filler with up to 25% by weight of at least one viscosity modifier, and a remainder quantity of styrene butadiene block copolymer.

In an alternate embodiment the masterbatch composition employed further includes up to 70% of at least one filler as previously discussed.

In yet a further embodiment of the present invention, the masterbatch composition employed contains 0 to 50% by weight of at least one processing aid selected from the group consisting of metallic stearates, organic stearates, and fluroelastomers.

A quantity of at least one antioxidant material ranging from 0–2% by weight, is also contemplated in an embodiment of the present invention.

The plastic composition of the present invention further includes ethylene bis stearamide, polybutylene or hot melt acrylate copolymers as a viscosity modifier.

In addition the masterbatch composition of the plastic composition of the present invention may include at least one pigment selected from the group of carbon black, titanium dioxide, and ultra marine blue.

The plastic composition of the present invention may be prepared by conventional processing methods, for example by incorporating the masterbatch into the plastic at a temperature above the softening temperature of the plastic in a conventional processing apparatus, such as an extruder, kneader, mixer, injection molder, or blow molding machine.

The following testing procedures are used in the determination and evaluation of the properties of the plastic compositions described in the following examples.

The tensile strength and elongation of the plastic compositions were measured by the procedure set forth in ISO R 527/ASTM D638 M.

The Izod impact resistance of the plastic compositions was measured by the procedure set forth in ISO 180 (no ASTM directly corresponding).

The effectiveness and advantages of the present invention will be further illustrated by the following examples.

EXAMPLES 1–3

These examples illustrate the preparation of three masterbatch compositions of the present invention. Masterbatch composition A ("Mb-A") was a white masterbatch. Masterbatch composition B ("Mb-B") was a black masterbatch. Masterbatch composition C ("Mb-C") was a blue masterbatch.

Masterbatch compositions Mb-A, Mb-B and Mb-C were prepared from the following components in the amounts indicated in Table 1 below utilizing a Banbury mixer. All percentages are percentage by weight of the final masterbatch composition:

TABLE 1

Masterbatch Compositions

| Component | Mb-A (white) | Mb-B (black) | Mb-C (blue) |
| --- | --- | --- | --- |
| Pigment | 60.0%, $TiO_2$ | 35.0%, BP800 Carbon Black | 2.5%, $TiO_2$ 26.0%, UMB20 |
| Filler | | | 35.0%, $CaCO_3$ |
| Viscosity Modifier | 6.0%, PB | 10.0%, EBS | 6.0%, EMA |
| Processing Aid | 0.6%, ZnSt | 0.6%, ZnSt | 3.0%, CaSt |
| Antioxidant | 0.25% U626 0.25% Ir. 565 | | |
| SBS | 32.9%, SBS | 54.4%, SBS | 27.5%, SBS |

The following terms are as defined below:

BP800 Carbon Black: A carbon black produced and sold by Cabot Corporation, Boston, Mass., having the following analytical properties: DBP 68, $N_2SA$ 210.

CaCO₃: calcium carbonate
EBS: ethylene bis stearamide
PB: polybutylene having a molecular weight from 250 to 10000
EMA: ethylene methyl acrylate hot melt acrylic copolymer
ZnSt: Zinc Stearate
CaSt: Calcium Stearate
UMB20: Ultramarine blue 20 (blue pigment)
SBS: styrene butadiene styrene copolymer

EXAMPLE 4

This example illustrates the performance properties of thermoplastics incorporating masterbatch compositions of the present invention.

The following thermoplastics were utilized:

Hostaform 9021—a polyacetal (POM) manufactured and sold by Hoechst;
HPP804—a polycarbonate (PC) manufactured and sold by General Electric;
Ultradur B4500—a polybutylene terephthalate (PBT) manufactured and sold by BASF;
Luranyl KR2402—a polyethylene oxide—high impact polystyrene (PPE/SB) manufactured and sold by BASF;
Lucryl G66—a polymethylmethacrylate (PMMA) manufactured and sold by BASF;
Ultramid B3K—a polyamide manufactured and sold by BASF;
Kodar 6783—a polycyclohexanedimethanol ethylene glycol terephthalic acid manufactured and sold by Kodak.

The following styrene butadiene styrene (SBS) polymers were utilized:

| Phillips | KK 38 KR 01 KR 03 KR 04 KR 05 | star shaped SBS copolymer having a polybutadiene content of approximately 25% to 30%, commercially available from Phillips 66, Houston, Texas; |
|---|---|---|
| Finaclear | 520 530 | are linear block SBS copolymers having a polybutadiene content of approximately 22 to 27%, commercially available from Fina Oil & Chemical, Dallas, Texas; |
| Finaprene | 414 | are star shaped block SBS copolymer having a polybutadiene content of approximately 60%; and |
| Styrolux | 684D KR2689 | are star shaped SBS copolymers having a polybutadiene content of approximately 25 to 30% sold by BASF. |

Masterbatch compositions Mb-A and Mb-B were prepared in accordance with Examples 1–2 above and were prepared using KK38 and Finaclear 520 as the SBS component.

In order to compare the performance characteristics imparted by the masterbatch compositions of the present invention with the performance characteristics of a desired virgin thermoplastic, performance tests were conducted on the virgin thermoplastic and also on thermoplastic compositions containing 5%, by weight Mb-A and on thermoplastic compositions containing 5.7%, by weight, Mb-B. For additional comparison purposes, performance tests were conducted on the thermoplastics containing 10%, by weight, each of the SBS polymers.

The performance tests conducted on each composition were tensile strength, elongation %, and Izod impact resistance. The results were as set forth in Table 2 below:

TABLE 2

Performance Characteristic of Thermoplastic Compositions

| Comp. (kJ/m²) | Plastic | SBS | Masterbatch | Tensile Strength (daN/mm²) | Elong. (%) | Izod |
|---|---|---|---|---|---|---|
| A | Hostaform 9021 | None | None | 4.55 | 72 | 3.3 |
| B | Hostaform 9021 | 520 | None | 4.04 | 50 | 2.41 |
| C | Hostaform 9021 | KK38 | None | 3.81 | 59 | 2.67 |
| D | Hostaform 9021 | KR2689 | None | 3.85 | 45 | 2.67 |
| E | Hostaform 9021 | None | Mb-A (white) | 4.27 | 70 | 3.4 |
| F | Hostaform 9021 | None | Mb-B (black) | 4.27 | 70 | 2.8 |
| G | HPP804 | None | None | 6.31 | 102 | 7.53 |
| H | HPP804 | 520 | None | 5.65 | — | 2.87 |
| I | HPP804 | KK38 | None | 5.62 | 127 | 33.55 |
| J | HPP804 | KR2689 | None | 5.86 | 121 | 6.63 |
| K | CALIBRE 30010 | None | Mb-A (white) | 5.86 | 44.6 | 9.14 |
| L | CALIBRE 30010 | None | Mb-B (black) | 5.89 | 45.6 | 9.66 |
|   | CALIBRE 30010 | None | None | 5.96 | 46.3 | 8.13 |
| M | Ultradur B4500 | None | None | 5.55 | 150 | 2.67 |
| N | Ultradur B4500 | 520 | None | 4.77 | 353 | — |
| O | Ultradur B4500 | KK38 | None | 5.05 | 146 | 3.01 |
| P | Ultradur B4500 | KR2689 | None | 5.07 | 260 | 2.96 |
| Q | Ultradur B4500 | None | Mb-A (white) | 5.44 | 206 | 2.8 |
| R | Ultradur B4500 | None | Mb-B (black) | 5.52 | 86 | 2.58 |
| S | Luranyl KR2402 | None | None | 6.18 | 36 | 10.72 |
| T | Luranyl KR2402 | 520 | None | 5.84 | 44 | 15.71 |
| U | Luranyl KR2402 | KK38 | None | 5.71 | 52 | 17.2 |
| V | Luranyl KR2402 | KR2689 | None | 5.67 | 64 | 14.57 |
| W | Luranyl KR2402 | None | Mb-A (white) | — | — | 9.97 |
| X | Luranyl KR2402 | None | Mb-B (black) | — | — | 12.02 |
| AA | Lucryl G66 | None | None | 8.16 | 2 | 0.44 |
| AB | Lucryl G66 | 520 | None | 7.6 | 3.6 | 0.53 |
| AC | Lucryl G66 | KK38 | None | 7.53 | 3.6 | 0.56 |
| AD | Lucryl G66 | KR2689 | None | 7.58 | 3.6 | 0.58 |
| AE | Lucryl G66 | None | Mb-A (white) | 8.03 | 3.6 | 0.57 |
| AF | Lucryl G66 | None | Mb-B (black) | 7.8 | 1 | 0.5 |
| AG | Ultramid B3K | None | None | 4.62 | 236 | 3.15 |
| AH | Ultramid B3K | 520 | None | 4.55 | 358 | 3.01 |
| AI | Ultramid B3K | KK38 | None | 4.35 | 370 | 3.09 |
| AJ | Ultramid B3K | KR2689 | None | 4.32 | 338 | 3.18 |
| AK | Ultramid B3K | None | Mb-A (white) | 4.97 | 255 | 3.36 |
| AL | Ultramid B3K | None | Mb-B (black) | 4.76 | 244 | 3.01 |
| AM | Kodar 6783 | None | None | 5.44 | 228 | — |
| AN | Kodar 6783 | 520 | None | 5.2 | 226 | — |
| AO | Kodar 6783 | KK38 | None | 4.97 | 415 | — |
| AP | Kodar 6783 | KR2689 | None | 4.86 | 154 | — |
| AQ | Kodar 6783 | None | Mb-A (white) | 5.34 | 222 | — |
| AR | Kodar 6783 | None | Mb-B (black) | 5.34 | 100 | — |

— = not tested
Comp. = composition
Elong. = elongation
Izod = Izod impact resistance
SBS = styrene butadiene styrene copolymer
520 = Finaclear 520 SBS
KK38 = Phillips KK38 SBS
KR2689 = Styrolux KR2689 SBS The results provided in Table 2 illustrate that thermoplastic compositions, E, F, K, L, Q, R, W, X, AE, AF, AK, AL, AQ and AR of the present invention, incorporating a masterbatch composition of the present invention, have substantially similar, or improved, mechanical properties in comparison with the mechanical properties of the virgin plastic. It should be clearly understood that the forms of the present invention herein described are illustrative only and are not intended to limit the scope of the invention.

I claim:

1. A masterbatch composition comprising:

an SBS block copolymer;

a filler; and a viscosity modifier selected from the group consisting of ethylene bis stearamide, polybutylene and hot-melt acrylate copolymer, wherein the viscosity modifier is present in an amount up to 25% by weight of the composition and the filler is present in an amount up to about 85% by weight of the composition.

2. The composition of claim 1 further comprising a processing aid.

3. The composition of claim 1 further comprising an antioxidant.

4. The composition of claim 1 wherein the filler is a pigment.

5. The composition of claim 4 comprising at least about 26% by weight of pigment.

6. The composition of claim 5 comprising at least about 35% by weight of pigment.

7. A masterbatch resin consisting essentially of:

an SBS carrier resin;

a filler; and a viscosity modifier selected from the group consisting of ethylene bis stearamide, polybutylene and hot-melt acrylate copolymer.

8. The masterbatch resin of claim 7 comprising at least about 26% of the filler by weight.

9. The masterbatch resin of claim 8 comprising at least about 35% of the filler by weight.

* * * * *